United States Patent
Maus et al.

(10) Patent No.: US 9,441,056 B2
(45) Date of Patent: Sep. 13, 2016

(54) MULTISTAGE PROCESS FOR THE POLYMERIZATION OF ETHYLENE

(71) Applicant: Basell Poliolefine Italia S.r.l., Milan (IT)

(72) Inventors: Andreas Maus, Frankfurt (DE); Gerhardus Meier, Frankfurt (DE); Gianni Collina, Ferrara (IT); Diego Brita, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

(21) Appl. No.: 14/653,961

(22) PCT Filed: Dec. 10, 2013

(86) PCT No.: PCT/EP2013/076013
§ 371 (c)(1),
(2) Date: Jun. 19, 2015

(87) PCT Pub. No.: WO2014/095473
PCT Pub. Date: Jun. 26, 2014

(65) Prior Publication Data
US 2015/0353655 A1    Dec. 10, 2015

Related U.S. Application Data

(60) Provisional application No. 61/739,832, filed on Dec. 20, 2012.

(30) Foreign Application Priority Data

Dec. 19, 2012   (EP) ..................................... 12198087

(51) Int. Cl.
*C08F 110/02*     (2006.01)
*C08F 2/14*       (2006.01)
*C08F 2/38*       (2006.01)
*C08F 10/02*      (2006.01)

(52) U.S. Cl.
CPC ............... *C08F 110/02* (2013.01); *C08F 2/14* (2013.01)

(58) Field of Classification Search
CPC .... C08F 2/14; C08F 110/02; C08F 2500/12; C08F 2500/14; C08F 2/38
USPC .......................................................... 526/65
See application file for complete search history.

(56) References Cited

U.S. PATENT DOCUMENTS

| 6,627,710 B1 * | 9/2003 | Sacchetti ................ C08F 10/00 502/103 |
| 2004/0152590 A1 * | 8/2004 | Collina ................ C08F 210/16 502/128 |
| 2010/0160154 A1 | 6/2010 | Morini et al. |
| 2010/0305283 A1 | 12/2010 | Dorini et al. |
| 2012/0010374 A1 | 1/2012 | Brita et al. |

FOREIGN PATENT DOCUMENTS

| EP | 395083 A2 | 10/1990 |
| EP | 0476432 A2 | 3/1992 |
| WO | WO-2007147714 A1 | 12/2007 |
| WO | WO-2009037080 A1 | 3/2009 |
| WO | WO-2010097305 A1 | 9/2010 |
| WO | WO-2011076669 A2 | 6/2011 |

* cited by examiner

*Primary Examiner* — Fred M Teskin

(57) ABSTRACT

The present invention relates to a slurry process for preparing an ethylene polymer having a melt flow ratio F/P, which is the ratio among the melt index value measured according to ASTM 1238 condition "F" and the melt index value measured according to ASTM 1238 condition "P" of equal to or lower than 27, carried out in two or more stages of polymerization at temperatures in the range from 60 to 120° C., in which at least two of the said two or more polymerization stages are carried out under different amounts of molecular weight regulator, said process being carried out in the presence of (A) a solid catalyst component comprising Ti, Mg, halogen, having a porosity ($P_F$), measured by the mercury method and due to pores with radius equal to, or lower than, 1 μm, of at least 0.3 cm$^3$/g and a surface area determined by BET method, of lower than 100 m$^2$/g, and being further characterized by the fact that more than 50% of the titanium atoms are in a valence state lower than 4 and (B) of an organoaluminum compound.

13 Claims, No Drawings

MULTISTAGE PROCESS FOR THE POLYMERIZATION OF ETHYLENE

This application is the U.S. National Phase of PCT International Application PCT/EP2013/076013, filed Dec. 10, 2013, claiming benefit of priority to European Patent Application No. 12198087.4, filed Dec. 19, 2012, and benefit of priority under 35 U.S.C. §119(e) of U.S. Provisional Application No. 61/739,832 filed Dec. 20, 2012, the contents of which are incorporated herein by reference in their entirety.

FIELD OF THE INVENTION

The present invention relates to a multistage slurry process for the polymerization of ethylene, in particular for the production of relatively tailored molecular weight distribution polyethylene to be used in large blow molding applications, carried out in the presence of a catalyst system comprising a solid catalyst component having specific chemical and physical features.

BACKGROUND OF THE INVENTION

Slurry polymerization for preparing ethylene polymers is a known technique in which a non-polymerizable hydrocarbon diluent is used as reaction medium. This kind of polymerization is generally carried out in a turbulent flow reactor, such as a continuous pipe reactor in the form of a loop, or in continuous stirred tank reactors (CSTR). The so-called loop reactor is well known and is described in the Encyclopedia of Chemical Technology, 3rd edition, vol. 16 page 390. In the loop reactor and the CSTR as well LLDPE and HDPE resins can be produced.

The MWD is a particularly important characteristic for ethylene (co) polymers, in that it affects both the rheological behavior and therefore the processability of the melt, and the final mechanical properties. Polyolefins having a broad MWD, particularly coupled with relatively high average molecular weights, are preferred in high speed extrusion processing (films and pipe manufacturing) conditions in which a narrow MWD could cause melt fracture.

Polyethylene to be used in blow molding applications and in particular for large blow molding manufacturing, may have different requirements I terms of MWD. In fact, the broadening the MWD causes the melt strength of the polymer to be higher which, as a consequence, increases the difficulty in cutting off the pinch-off weld (excess of the resin outside the mold during extrusion blow molding) of the final finished article.

Polyethylene having broad MWD can be prepared by multi-step process based on the production of different molecular weight polymer fractions in each single stage, sequentially forming macromolecules with different length on the catalyst particles.

To this end, it can be used a double loop reactor where the two reactors are connected in series in which a high molecular weight fraction may be produced in the first loop reactor and a low molecular weight fraction may be produced in the second loop reactor. In this way, a bimodal polymer or a polymer having a broad molecular weight distribution is made.

A multimodal polyethylene can also be prepared via a multistage reaction sequence comprising successive slurry polymerization stages carried out under predetermined and different reaction conditions in continuously stirred tank reactors so as to obtain polyethylene fractions having different average molecular weight. In this case, monomers and a molar mass regulator, preferably hydrogen, are firstly polymerized in a first reactor under a first set of reaction conditions in the presence of the suspension medium and a suitable catalyst, preferably a Ziegler catalyst, then transferred to a second reactor and further polymerized under a second set of reaction conditions, and, if the polyethylene to be prepared is for example trimodal, further transferred to a third reactor and further polymerized under a third set of reaction conditions, with the first reaction conditions differing from the second and third reaction conditions so as to obtain three polyethylene fractions having different average molecular weight. This difference in molecular weight in the different ethylene polymer fractions is normally evaluated through the determination of the flowability index.

A process of this type was disclosed in WO2010/097305 which relates to a process for preparing polyethylene for pipe application endowed with a broad molecular weight distribution (melt flow ratio F/P, which is the ratio among the melt index value measured according to ASTM 1238 condition "F" and the melt index value measured according to ASTM 1238 condition "P" of higher than 25) carried out in a multistage process with a solid catalyst component comprising Ti, Mg, halogen, and having a specific porosity.

While the process seems to work well under the conditions employed for the preparation of very broad MWD, it suffers from bad operability (pluggage of outer reactor cooled) and low activities when the polymerization conditions are set for the preparation of narrower molecular weight distribution polyethylene.

The applicant has now found that process operability and activity can be improved by a specific modification of the catalyst component.

SUMMARY OF THE INVENTION

Accordingly, it constitutes an object of the present invention a slurry process for preparing an ethylene polymer having a melt flow ratio F/P, which is the ratio among the melt index value measured according to ASTM 1238 condition "F" and the melt index value measured according to ASTM 1238 condition "P" of equal to, or lower than, 27 carried out in two or more stages of polymerization at temperatures in the range from 60 to 120° C., in which at least two of the said two or more polymerization stages are carried out under different amounts of molecular weight regulator, said process being carried out in the presence of (A) a solid catalyst component comprising Ti, Mg, Al, halogen, having a porosity (PF), measured by the mercury method and due to pores with radius equal to, or lower than, 1 μm, of at least 0.3 cm3/g and a surface area determined by BET method, of lower than 100 m2/g, and being further characterized by the fact that more than 10% of the titanium atoms are in a valence state lower than 4 and (B) of an organoaluminum compound.

DETAILED DESCRIPTION OF THE INVENTION

Preferably, the porosity $(P_F)$ is higher than 0.4 cm$^3$/g and preferably ranging from 0.4 to 1 cm$^3$/g, more preferably from 0.45 to 0.9 cm$^3$/g.

Preferably the said solid catalyst component (A) is characterized by a surface area determined by BET method, ranging from 30 to 80 m$^2$/g.

The porosity measured by the BET method is generally comprised between 0.1 and 0.7, preferably from 0.15 to 0.5 cm$^3$/g.

In a preferred aspect the catalyst component of the invention comprises a Ti compound having at least one Ti-halogen bond supported on a magnesium chloride which is preferably magnesium dichloride and more preferably magnesium dichloride in active form. In the context of the present application the term magnesium chloride means magnesium compounds having at least one magnesium chloride bond.

In the catalyst component of the invention the average pore radius value, for porosity due to pores up to 1 µm, ranges from 0.01 to 0.5 µm, preferably from 0.08 to 0.30 µm.

The particles of solid component (A) preferably have substantially spherical morphology and average diameter comprised between 5 and 50 µm, preferably from 8 to 35 µm, more preferably from 10 to 30 µm and especially from 10 to 25 µm. As particles having substantially spherical morphology, those are meant wherein the ratio between the greater axis and the smaller axis is equal to or lower than 1.5 and preferably lower than 1.3.

The magnesium dichloride in the active form is characterized by X-ray spectra in which the most intense diffraction line which appears in the spectrum of the non active chloride (lattice distanced of 2.56 Å) is diminished in intensity and is broadened to such an extent that it becomes totally or partially merged with the reflection line falling at lattice distance (d) of 2.95 Å. When the merging is complete the single broad peak generated has the maximum of intensity which is shifted towards angles lower than those of the most intense line.

The solid components of the invention may comprise an electron donor compound (internal donor), selected for example among ethers, esters, amines and ketones. If any it is advisable to use low amounts of donor, such as to give ED/Ti molar ratios in the final solid catalyst component lower than 1, preferably lower than 0.5 and in certain cases not to include any amount of electron donor compound in order for it to be absent in the final solid catalyst component (A).

The preferred titanium compounds have the formula Ti(OR$^{II}$)$_n$X$_{y-n}$, wherein n is a number comprised between 0 and 3 inclusive, y is the valence of titanium, R$^{II}$ is an alkyl, cycloalkyl or aryl radical having 1-8 carbon atoms and X is halogen. In particular R$^{II}$ can be ethyl, isopropyl, n-butyl, isobutyl, 2-ethylhexyl, n-octyl and phenyl, (benzyl); X is preferably chlorine.

If y is 4, n varies preferably from 0 to 2; if y is 3, n varies preferably from 0 to 1. TiCl$_4$, and TiCl$_3$ are especially preferred. It is also preferred that more than 15% and preferably more than 20% of the titanium atoms are in the valence state lower than 4. As a further preferred embodiment the amount of Ti atoms in a valence state lower than 4 ranges from 25 to 90% based on the total amount of Ti atoms.

As a result of the preparation process, the catalyst component contains also aluminum atoms preferably in amounts ranging from 0.1 to 5% wt and preferably from 0.1 to 2.5% wt based on the total weight of said solid catalyst component.

The preparation of the solid catalyst component can be carried out according to several methods.

A method suitable for the preparation of spherical components mentioned above, comprises a step in which a compound MgCl$_2$.mR$^{III}$OH, wherein 0.3≤m≤1.7 and R$^{III}$ is an alkyl, cycloalkyl or aryl radical having 1-12 carbon atoms is reacted with the said titanium compound of the formula Ti(OR$^{II}$)$_n$X$_{y-n}$, in which n, y, X and R$^{II}$ have the same meaning defined above.

In this case MgCl$_2$.mR$^{III}$OH represents a precursor of Mg dihalide. Suitable MgCl$_2$.mR$^{III}$OH precursors can generally be prepared by subjecting precursors having a higher amount of alcohol to a thermal and/or chemical dealcoholation process. The thermal dealcoholation process is carried out in nitrogen flow at temperatures comprised between 50 and 150° C. until the alcohol content is reduced to the value ranging from 0.3 to 1.7. A process of this type is described in EP 395083.

The precursors to be dealcoholated are obtained by mixing alcohol and magnesium chloride in the presence of an inert hydrocarbon immiscible with the adduct, operating under stirring conditions at the melting temperature of the adduct (100-130° C.). Then, the emulsion is quickly quenched, thereby causing the solidification of the adduct in form of spherical particles. Representative methods for the preparation of these spherical adducts are reported for example in U.S. Pat. No. 4,469,648, U.S. Pat. No. 4,399,054, and WO98/44009. Another useable method for the spherulization is the spray cooling described for example in U.S. Pat. Nos. 5,100,849 and 4,829,034.

In the reaction step between the titanium compound and the MgCl$_2$.mR$^{III}$OH precursor, the molar ratio Ti/Mg is stoichiometric or higher; preferably this ratio is higher than 3. Still more preferably a large excess of titanium compound is used. Preferred titanium compounds are titanium tetrahalides, in particular TiCl$_4$. The reaction with the Ti compound can be carried out by suspending the adduct in cold TiCl$_4$ (generally 0° C.); the mixture is heated up to 80-140° C. and kept at this temperature for 0.5-8 preferably from 0.5 to 3 hours. The excess of titanium compound can be separated at high temperatures by filtration or sedimentation and siphoning.

Also the particle size distribution is narrow being the SPAN of the catalyst particles comprised between 0.7 and 1.3 preferably from 0.8 to 1.2. The SPAN being defined as the value of the ratio $$\frac{P90 - P10}{P50},$$

wherein P90 is the value of the diameter such that 90% of the total volume of particles have a diameter lower than that value; P10 is the value of the diameter such that 10% of the total volume of particles have a diameter lower than that value and P50 is the value of the diameter such that 50% of the total volume of particles have a diameter lower than that value.

In the preferred preparation processes the solid catalyst component obtained after reaction with the titanium compound is subject to a further stage, in which the obtained solid is contacted with an aluminum alkyl compound in order to generate the final solid catalyst component. The aluminum alkyl compound can be selected from hydrocarbyl aluminum compounds in which the hydrocarbyl groups, equal or different, have from 1 to 10 carbon atoms in the hydrocarbyl radical. Preferred hydrocarbyl aluminum compounds are trialkylaluminum triethylaluminum, triisobutylaluminum, trioctylaluminum, and trialkenyl aluminum compounds such as aluminium triisoprenyl. Preference is given to triethylaluminum, tri-n-octyl (TnOA) and triisoprenylaluminum. Also alkylaluminum halides and in particular alkylaluminum chlorides such as diethylaluminum chloride (DEAC), diisobutylalumunum chloride, Al-sesquichloride and dimethylaluminum chloride (DMAC) can be used.

The mixing of the two reactants can be carried out in a stirred vessel at a temperature of from −30° C. to 150° C. preferably from 0 to 100° C. for a time period ranging from 10 min to 10 min to 48 hours, preferably from 1 hour to 36 hours. In general terms, higher temperatures allows shorter contact times while, on the opposite, lower temperatures may require longer reaction times. The contact preferably takes place in hydrocarbon diluents like propane, hexane, xylene, and so on. The aluminum alkylchloride compound is used in amounts such that the Al/Ti molar ratio (calculated with reference to the Ti content of the solid catalyst component as obtained by the previous step) is from 0.05 to 10, preferably from 0.1 to 5.

After the reaction, hydrocarbon washings can be carried out until the supernatant mother liquor has Cl and Ti concentrations of less than 10 mmol/l.

The catalyst component (B) of the invention is selected from Al-alkyl compounds possibly halogenated. In particular, it is selected from Al-trialkyl compounds, for example Al-trimethyl, Al-triethyl, Al-tri-n-butyl, Al-triisobutyl are preferred. The Al/Ti ratio is higher than 1 and is generally comprised between 5 and 800.

The above-mentioned components (A)-(B) can be fed separately into the reactor where, under the polymerization conditions can exploit their activity. It may be advantageous to carry out a pre-contact of the above components, optionally in the presence of small amounts of olefins, for a period of time ranging from 0.1 to 120 minutes preferably in the range from 1 to 60 minutes. The pre-contact can be carried out in a liquid diluent at a temperature ranging from 0 to 90° C. preferably in the range of 20 to 70° C.

The so formed catalyst system can be used directly in the polymerization process of the invention or, alternatively, it can be pre-polymerized beforehand.

As explained, the process of the present invention for the preparation of broad molecular weight polyethylene comprises at least two polymerization stages carried out under different amounts of molecular weight regulator. As mentioned, the process may be carried out either in continuous stirred tank reactor or in liquid full loop reactor. Independently from the process technique, hydrogen is the preferred molecular weight regulator.

When using liquid full loop reactors the hydrocarbon slurry diluent is preferably isobutane, but also other hydrocarbon diluents known in this art, like hexane, heptane or mixtures thereof. In this regard, it is preferable that the present process is carried out in accordance with the process of EP 0649860, as described above. Preferably a low concentration of hydrogen is maintained in the first reactor, for instance between 0 and 0.1% by volume, and a high concentration of hydrogen in the second reactor, for instance between 0.5 and 2.4% by volume.

Preferably, the reactor pressure ranges from 30 to 55 bars, more preferably from 40 to 50 bars. The reactor pressure to some extent controls the quantity of slurry that is taken out of the reactor. One embodiment of a double loop reactor process is below summarized. The process is a continuous process. Ethylene is polymerized in isobutane in the presence of a comonomer, for example hexene-1, hydrogen, catalyst, activating agent and anti-fouling agent. The slurry is circulated by a pump in the reactor which essentially consists of vertical jacketed pipe sections connected by trough elbows. The polymerization heat is removed by a water-cooling jacket. The polyethylene is taken out of the reactor with some diluent through settling legs and discontinuous discharge valves. Only a small fraction of the total circulating flow is withdrawn. It is moved to a polymer degassing section in which the solid content is increased.

When using continuous stirred tank reactors, the polymerization process is preferably carried out with the highest hydrogen concentration being set in the first reactor. In the subsequent, further reactors, the hydrogen concentration is preferably gradually reduced, so that the hydrogen concentration used in the third reactor is lower with respect to hydrogen concentration used in the second reactor. The suspension medium is typically a saturated hydrocarbon which is liquid at the polymerization conditions. Preferably, when using three reactors, in the second reactor and in the third reactor a predetermined comonomer concentration is used, preferably increasing from the second reactor to the third reactor. As stated above, in the processes where an ethylene copolymer fraction is prepared, preferably in the second reactor and in the third reactor, ethylene is thus used as monomer and an olefin having from 4 to 8 carbon atoms is preferably used as comonomer.

The (co)polymerization of ethylene is carried out at temperatures in the range from 70 to 90° C., preferably from 80 to 90° C., at a preferred pressure in the range from 2 to 20 bar, preferably from 2 to 10 bar.

The molecular mass distribution of the polyethylene molding composition of the present invention can be trimodal. So, in order to prepare a trimodal polyethylene molding composition, the polymerization of ethylene is preferably carried out in a continuous slurry process performed in three reactors connected in series, wherein preferably different reaction conditions are respectively set in the three reactors. Accordingly, in the first reactor, the catalyst components (A) and (B) is preferably fed in together with suspension medium, ethylene and hydrogen. Preferably, no comonomer is introduced in the first reactor. The suspension from the first reactor is then transferred to a second reactor in which ethylene, hydrogen and preferably also a predetermined amount of comonomer, for example 1-butene, are added. The amount of hydrogen fed in the second reactor is preferably reduced compared to the amount of hydrogen fed in the first reactor. The suspension from the second reactor is transferred to the third reactor. In the third reactor, ethylene, hydrogen and, preferably, a predetermined amount comonomer, for example 1-butene, preferably in an amount higher than the amount of comonomer used in the second reactor, are introduced. The amount of hydrogen in the third reactor is reduced compared to the amount of hydrogen in the second reactor. From the polymer suspension leaving the third reactor the suspension medium is separated and the resulting polymer powder is dried and then preferably pelletized.

In particular, by proper selection of the polymerization conditions in the various stages (hydrogen amount, temperature, residence time etc) ethylene (co)polymers are produced having a F/P melt index ratio lower than 27 and in particular ranging from 19 to 24 which is the most suitable for blow moldings and in particular large blow molding. The polyethylene composition obtained shows a density in the range 0.95 to 0.96, a Melt Flow Rate according to ASTM 1238 condition "P" of from 0.1 to 2.

The polyethylene composition of the invention may comprise additives to be mixed with the polyethylene. Examples of these additives are heat stabilizers, antioxidants, UV absorbers, light stabilizers, metal deactivators, compounds which destroy peroxide, and basic co-stabilizers in amounts of from 0 to 10% by weight, preferably from 0 to 5% by weight, and also fillers, reinforcing agents, plasticizers, lubricants, emulsifiers, pigments, optical brighteners, flame retardants, antistatics, blowing agents, or a combination of these, in total amounts of from 0 to 50% by weight, based on the total weight of the mixture.

As already mentioned, the catalysts of the present invention allows the process to be run smoothly and reliably and offers the capability to polymerize with high activity under the conditions used producing a polyethylene with valuable mechanical properties.

EXAMPLES

Characterizations

The properties are determined according to the following methods:

density: measured at 23° C. in accordance with ISO 1183, in [g/cm3];

Porosity and surface area with nitrogen: are determined according to the B.E.T. method (apparatus used SORPTOMATIC 1900 by Carlo Erba).

Porosity and surface area with mercury:

The measure is carried out using a "Porosimeter 2000 series" by Carlo Erba.

The porosity is determined by absorption of mercury under pressure. For this determination use is made of a calibrated dilatometer (diameter 3 mm) $CD_3$ (Carlo Erba) connected to a reservoir of mercury and to a high-vacuum pump ($1 \cdot 10^{-2}$ mbar). A weighed amount of sample is placed in the dilatometer. The apparatus is then placed under high vacuum (<0.1 mm Hg) and is maintained in these conditions for 20 minutes. The dilatometer is then connected to the mercury reservoir and the mercury is allowed to flow slowly into it until it reaches the level marked on the dilatometer at a height of 10 cm. The valve that connects the dilatometer to the vacuum pump is closed and then the mercury pressure is gradually increased with nitrogen up to 140 kg/cm². Under the effect of the pressure, the mercury enters the pores and the level goes down according to the porosity of the material.

The porosity (cm³/g), both total and that due to pores up to 1 μm, the pore distribution curve, and the average pore size are directly calculated from the integral pore distribution curve which is function of the volume reduction of the mercury and applied pressure values (all these data are provided and elaborated by the porosimeter associated computer which is equipped with a "MILESTONE 200/2.04" program by C. Erba.

MIF flow index: ASTM-D 1238 condition F
MIP flow Index ASTM-D 1238 condition P
Bulk density: DIN-53194

Determination of Mg, $Ti_{(tot)}$ and Al: has been carried out via inductively coupled plasma emission spectroscopy (ICP) on a "I.C.P SPECTROMETER ARL Accuris".

The sample was prepared by analytically weighting, in a "fluxy" platinum crucible", 0.1÷03 g of catalyst and 3 gr of lithium metaborate/tetraborate 1/1 mixture. The crucible is placed on a weak Bunsen flame for the burning step and then after addition of some drops of KI solution inserted in a special apparatus "Claisse Fluxy" for the complete burning. The residue is collected with a 5% v/v $HNO_3$ solution and then analyzed via ICP at the following wavelength: Magnesium, 279.08 nm; Titanium, 368.52 nm; Aluminum, 394.40 nm.

Determination of Reduced Titanium Species 0.5÷2 g of the sample in powder form are dissolved in 100÷150 ml of HCl 2.7M in the presence of dry ice to create an inert atmosphere. The so obtained solution is then subject to a volumetric titration with a solution of ammonium ferric sulphate 0.1N in water, in the presence of dry ice, using as indicator of the equivalence point ammonium sulfocyanate (25% wt/v water solution). The stoichiometric calculations based on the volume of the titration agent consumed give the weight amount of $Ti^{3+}$ in the sample.

Example 1

Preparation of the Solid Component (A)

Preparation of the Spherical $MgCl_2$-EtOH Adduct

A magnesium chloride and alcohol adduct containing about 3 mols of alcohol having spherical form and average size of about 12 μm was prepared following the method described in example 2 of U.S. Pat. No. 4,399,054.

The spherical support, prepared according to the general method underwent a thermal treatment, under $N_2$ stream, over a temperature range of 50-150° C. until spherical particles having a residual ethanol content of about 22% wt. Into a 40 L stirred tank reactor, purged with nitrogen, 35 L of $TiCl_4$ were introduced at 0° C. Then, at the same temperature, 2450 g of a spherical $MgCl_2$/EtOH adduct containing 22% wt of ethanol and prepared as described above were added under stirring. The temperature was raised to 135° C. in 2 h and maintained for 3.5 h. Then, the stirring was discontinued, the solid product was allowed to settle and the supernatant liquid was siphoned off. The solid residue was then washed two times with fresh hexane at 60° C. and three more times at 25° C. and dried under vacuum at 30° C., then analyzed.

Post-Treatment

The so obtained catalyst component was suspended in hexane at a concentration of 60 mmol/L based on Ti atoms and reacted with TnOA for 4.8 hours at 60° C. under stirring using an amount of alkyl aluminum such that the Al/Ti ratio is 0.85/1.

After that time the suspension was washed with hydrocarbon, dried and analyzed. The amount of reduced titanium species was 24%. The Hg porosity was 0.63 cm³/g, with an average pore radius of 0.15 μm while the surface area measured by BET was 51.6 m²/g. The Al content was 0.5% wt.

The catalyst was then re-suspended in hexane for use in polymerization.

Polymerization of Ethylene

The polymerization of ethylene was carried out in a continuous process in three continuously stirred reactors connected in series. The catalyst prepared as described above example 1, was fed into the first reactor in an amount of 3.2 mmol/h, together with sufficient hexane as suspension medium, triethylaluminum as cocatalyst (0.6 mmol/l), ethylene and hydrogen. The amount of ethylene and the amount of hydrogen were set so that the $H_2/C_2$ ratio was 2. The first reactor was fed with Hexane, ethylene, catalyst and co-catalyst and the polymerization was carried out at a temperature of 80° C., a pressure of 5.0 bars, a $H_2/C_2$-ratio of 2.0, with a mean residence time (τ) of 4.1 hours. Besides jacket cooling of the reactor (present in all 3 reactors), the main part of the heat of reaction is dissipated by an outer cooler. Therefore the suspension is pumped from reactor 1 through a double jacket pipe cooler where the suspension is cooled to a temperature below reactor 1 temperature. From there the polymer-hexane slurry is going back to reactor 1.

From reactor 1 the suspension is transferred to intermediate first flash-vessel, which allows hydrogen depressurization, and then into reactor 2 where $H_2/C_2$-ratio is 0.37. In the second reactor more ethylene was fed and the polymerization was carried out at a temperature of 85° C., a pressure of 4.7 bars, with a mean residence time ($\tau$) of 1.6 hours. Equally to reactor 1, reactor 2 is cooled by jacket cooling and an additional outer cooler (double jacket pipe), which removes the majority of the heat of reaction.

The outer cooler loops are susceptible for disturbances and pluggage, which might be so critical that the polymerization has to be stopped.

From reactor 2 the suspension is transferred via a further hydrogen depressurization vessel (flash2) to reactor 3 where the $H_2/C_2$-ratio was 0.06.

The third reactor—where further ethylene was fed—was operated at a temperature of 81° C., a pressure of 3.4 bars, with a mean residence time of 0.8 hours. In the third reactor an amount of 0.3 g 1-butene per kg ethylene was fed. Then the polymer-slurry left reactor 3, solvent and polymer were separated, and the polymer powder was dried and pelletized.

The polymerization results are reported in table 1.

Example 2

Preparation of the Solid Component (A)

Preparation of the Spherical $MgCl_2$-EtOH Adduct

A magnesium chloride and alcohol adduct containing about 3 mols of alcohol having spherical form and average size of about 12 µm was prepared following the method described in example 2 of U.S. Pat. No. 4,399,054.

The spherical support, prepared according to the general method underwent a thermal treatment, under $N_2$ stream, over a temperature range of 50-150° C. until spherical particles having a residual ethanol content of about 22% wt were obtained Into a 40 L stirred tank reactor, purged with nitrogen, 35 L of $TiCl_4$ were introduced at 0° C. Then, at the same temperature, 2450 g of a spherical $MgCl_2$/EtOH adduct containing 22% wt of ethanol and prepared as described above were added under stirring. The temperature was raised to 135° C. in 2 h and maintained for 3.5 h. Then, the stirring was discontinued, the solid product was allowed to settle and the supernatant liquid was siphoned off. The solid residue was then washed two times with fresh hexane at 60° C. and three more times at 25° C. and dried under vacuum at 30° C., then analyzed.

Post-Treatment

The so obtained catalyst component was suspended in hexane at a concentration of 10 mmol/lit based on Ti atoms and reacted with TEA for 24 hours at room temperature under stirring using an amount of alkyl aluminum such that the Al/Ti ratio is 0.2/1.

After that time the suspension was washed with hydrocarbon dried and analyzed. The amount of reduced Titanium species was 22%. The Al content was 0.9% wt. The Hg porosity was 0.68 cm³/g, with an average pore radius of 0.14 µm while the surface area measured by BET was 56.1 m²/g. The catalyst was then re-suspended in hexane for use in polymerization.

Polymerization of Ethylene

The polymerization of ethylene was carried out in a continuous process in three continuously stirred reactors connected in series with 2 depressurization vessels, as described in example 1. The catalyst prepared as described above example 1, was fed into the first reactor in an amount of 3.5 mmol/h, together with sufficient hexane as suspension medium, triethylaluminum as cocatalyst (0.6 mmol/1), ethylene and hydrogen. The amount of ethylene and the amount of hydrogen were set so that the $H_2/C_2$ ratio was 1.09. The polymerization in the first reactor was carried out at a temperature of 80° C., 4.3 bar pressure, $H_2/C_2$-ratio of 1.4, with a mean residence time 3.0 hours. Then the suspension was transferred from the first reactor via depressurization vessel 1 to the second reactor in which the $H_2/C_2$ ratio was 0.13. The polymerization in the second reactor was carried out at a temperature of 85° C., 2.2 bar pressure and a mean residence time of 2.5 hours. The suspension was then transferred from the second reactor via depressurization vessel 2 in the third reactor where a $H_2/C_2$ ratio was 0.27. The polymerization in the third reactor was carried out at a temperature of 85° C., 3.4 bar pressure, with a mean residence time of 1 hour. The suspension medium was separated from the polymer suspension leaving the third reactor and the remaining polymer powder was dried and pelletized. The polymerization results are reported in table 1.

Comparison Example 1

The polymerization was carried out as described in example 2 with the only difference that in the preparation of the catalyst component (A) the step of contacting with the aluminum alkyl compound was omitted. The amount of Ti reduced titanium species was below 5%.

The Hg porosity was 0.7 cm³/g, with an average pore radius of 0.15 µm while the surface area measured by BET was 55.1 m²/g. After less than 60 hours the run had to be stopped due to plugging of the outer cooler.

TABLE 1

| EX. | Activity (Kg/g) | Polymer Density g/cm³ | MIP | MIF/MIP | Swell ratio (%) |
|---|---|---|---|---|---|
| 1 | 33 | 0.954 | 0.15 | 21 | 148 |
| 2 | 28 | 0.954 | 0.14 | 22 | 140 |
| Comp. 1 | 16 | Not determined | 0.18 | 19 | Not determined |

What is claimed is:

1. A slurry process for preparing an ethylene polymer having a melt flow ratio F/P, which is the ratio among the melt index value measured according to ASTM 1238 condition "F" and the melt index value measured according to ASTM 1238 condition "P" of equal to or lower than 27, carried out in two or more stages of polymerization at temperatures from 60-120° C., in which at least two of the polymerization stages are carried out under different amounts of molecular weight regulator, the process being carried out in the presence of (A) a solid catalyst component comprising Ti, Mg, Al and halogen, having a porosity ($P_F$), measured by the mercury method and due to pores with radius equal to or lower than 1 µm, of at least 0.3 cm³/g, and a surface area determined by BET method, of lower than 100 m²/g, and being further characterized by the fact that more than 10% of the titanium atoms are in a valence state lower than 4 and (B) an organoaluminum compound.

2. The slurry process according to claim 1, in which the porosity ($P_F$) of catalyst component (A) is higher than 0.4 cm³/g.

3. The slurry process according to claim 1, in which the porosity ($P_F$) of catalyst component (A) ranges from 0.4 to 1 cm$^3$/g.

4. The slurry process according to claim 1, in which the surface area as determined by BET method ranges from 30-80 m$^2$/g.

5. The slurry process according to claim 1 in which the average pore radius value of catalyst component (A) for porosity due to pores up to 1 μm ranges from 0.08-0.3 μm.

6. The slurry process according to claim 1, in which the particles of solid component (A) have substantially spherical morphology and an average diameter of 8-35 μm.

7. The slurry process according to claim 1, in which more than 15% of the titanium atoms are in a valence state lower than 4.

8. The slurry process according to claim 1, in which the slurry process is carried out in two or more continuous stirred tank reactors.

9. The slurry process according to claim 8, in which the slurry process is carried out in three continuous stirred tank reactors connected in series having different concentrations of molecular weight regulator.

10. The slurry process according to claim 1, in which the ethylene polymer has F/P melt index ratio ranging from 19-24.

11. The slurry process according to claim 3, in which the porosity ($P_F$) of catalyst component (A) ranges from 0.45 to 0.9 cm$^3$/g.

12. The slurry process according to claim 1, wherein the molecular weight regulator comprises hydrogen.

13. The slurry process according to claim 12, wherein the at least two polymerization stages comprises a first polymerization stage and a second polymerization stage, wherein the first polymerization stage comprises at a first concentration of hydrogen at above 0 and less than 0.1 percent by volume and the second polymerization stage comprises a second concentration of hydrogen at above 0.5 and less than 2.4 percent by volume.

* * * * *

UNITED STATES PATENT AND TRADEMARK OFFICE
CERTIFICATE OF CORRECTION

PATENT NO. : 9,441,056 B2
APPLICATION NO. : 14/653961
DATED : September 13, 2016
INVENTOR(S) : Andreas Maus et al.

It is certified that error appears in the above-identified patent and that said Letters Patent is hereby corrected as shown below:

On the Title Page

Column 1, (30) Line 1    Delete "12198087" and insert --12198087.4--

In the Specification

Column 2    Line 51    Delete "(PF)," and insert --($P_F$),--
Column 2    Line 53    Delete "0.3 cm3/g" and insert --0.3 $cm^3$/g--
Column 2    Line 54    Delete "100 m2/g," and insert --100 $m^2$/g,--

Column 5    Line 7    Delete "10 min to 10 min to" and insert --10 min to--

Column 7    Line 20    Delete "[g/cm3];" and insert --[$g/cm^3$];--
Column 7    Line 53    Delete "Index" and insert --index:--

Column 9    Line 39    After "obtained", insert --.--

Signed and Sealed this
Eighth Day of January, 2019

Andrei Iancu
*Director of the United States Patent and Trademark Office*